US009350951B1

(12) United States Patent
Rowe

(10) Patent No.: US 9,350,951 B1
(45) Date of Patent: May 24, 2016

(54) METHOD FOR INTERACTIVE TRAINING AND ANALYSIS

(71) Applicant: Scott Dallas Rowe, Paradise Valley, AZ (US)

(72) Inventor: Scott Dallas Rowe, Paradise Valley, AZ (US)

(*) Notice: Subject to any disclaimer, the term of this patent is extended or adjusted under 35 U.S.C. 154(b) by 686 days.

(21) Appl. No.: 13/682,720

(22) Filed: Nov. 20, 2012

Related U.S. Application Data

(60) Provisional application No. 61/562,494, filed on Nov. 22, 2011.

(51) Int. Cl.
*H04N 7/18* (2006.01)

(52) U.S. Cl.
CPC ........................................ *H04N 7/18* (2013.01)

(58) Field of Classification Search
CPC ................. A63B 24/0003; A63B 2024/0012; A63B 69/0002; G06K 9/00342; H04N 7/18
See application file for complete search history.

(56) References Cited

U.S. PATENT DOCUMENTS

| | | | | |
|---|---|---|---|---|
| 5,184,295 A * | 2/1993 | Mann | | 473/221 |
| 5,249,967 A * | 10/1993 | O'Leary et al. | | 434/247 |
| 5,603,617 A * | 2/1997 | Light | | 434/252 |
| 5,681,223 A * | 10/1997 | Weinreich | | 472/61 |
| 5,823,786 A * | 10/1998 | Easterbrook | | 434/247 |
| 5,857,855 A * | 1/1999 | Katayama | | 434/247 |
| 5,919,149 A * | 7/1999 | Allum | | 600/595 |
| 5,971,766 A * | 10/1999 | Guiney | | 434/252 |
| 6,612,937 B1 * | 9/2003 | Whelan | | 473/268 |
| 7,018,211 B1 * | 3/2006 | Birkholzer et al. | | 434/257 |
| 7,041,014 B2 * | 5/2006 | Wright et al. | | 473/409 |
| 7,095,388 B2 * | 8/2006 | Truxa et al. | | 345/7 |
| 7,587,065 B2 * | 9/2009 | Matsumoto et al. | | 382/103 |
| 7,843,510 B1 * | 11/2010 | Ayer et al. | | 348/584 |
| 7,952,483 B2 * | 5/2011 | Ferguson et al. | | 340/573.1 |
| 8,175,326 B2 * | 5/2012 | Siegel | | 382/100 |
| 8,314,840 B1 * | 11/2012 | Funk | | 348/157 |
| 8,371,989 B2 * | 2/2013 | Kim et al. | | 482/8 |
| 8,488,888 B2 * | 7/2013 | Balan et al. | | 382/224 |
| 8,517,834 B2 * | 8/2013 | Krzeslo et al. | | 463/36 |
| 8,550,819 B2 * | 10/2013 | Anderson | | 434/252 |
| 8,620,146 B1 * | 12/2013 | Coleman | | 386/278 |
| 8,702,485 B2 * | 4/2014 | Flury et al. | | 463/7 |
| 8,702,516 B2 * | 4/2014 | Bentley et al. | | 463/39 |
| 8,724,906 B2 * | 5/2014 | Shotton et al. | | 382/218 |
| 8,848,058 B2 * | 9/2014 | Ayer et al. | | 348/157 |
| 8,892,219 B2 * | 11/2014 | Pryor | | 700/17 |
| 8,911,328 B2 * | 12/2014 | Alessandri et al. | | 482/8 |
| 8,944,928 B2 * | 2/2015 | Kaps et al. | | 473/199 |
| 8,953,909 B2 * | 2/2015 | Guckenberger et al. | | 382/305 |
| 8,994,826 B2 * | 3/2015 | Bentley | | 348/157 |
| 9,011,293 B2 * | 4/2015 | Shavit et al. | | 482/8 |
| 9,013,489 B2 * | 4/2015 | Evertt et al. | | 345/473 |
| 9,017,079 B2 * | 4/2015 | Nojima | | 434/252 |
| 9,039,527 B2 * | 5/2015 | Bentley et al. | | 463/31 |
| 2002/0064764 A1 * | 5/2002 | Fishman et al. | | 434/252 |
| 2002/0164567 A1 * | 11/2002 | Katayama | | 434/252 |
| 2004/0209698 A1 * | 10/2004 | Ueda et al. | | 473/150 |
| 2005/0196737 A1 * | 9/2005 | Mann | | A63B 69/3623 434/247 |

(Continued)

*Primary Examiner* — Brian Yenke
(74) *Attorney, Agent, or Firm* — Donald J. Lenkszus

(57) ABSTRACT

Apparatus and methods are provided that can display selected predetermined postures or predetermined motions on a frame by frame basis or as a continuous motion for imitation or emulation by a system user or subject to, for example, learn the motion or posture, or to be guided in rehabilitation from a trauma, surgery or other injury, or to permit comparison of the users posture or motion to a baseline posture or motion for purposes of analysis or diagnosis.

13 Claims, 6 Drawing Sheets

(56) References Cited

U.S. PATENT DOCUMENTS

| | | | |
|---|---|---|---|
| 2005/0272517 A1* | 12/2005 | Funk et al. | 473/222 |
| 2006/0094523 A1* | 5/2006 | Hall | 473/266 |
| 2006/0247070 A1* | 11/2006 | Funk et al. | 473/222 |
| 2007/0026958 A1* | 2/2007 | Barasch et al. | 473/266 |
| 2009/0042661 A1* | 2/2009 | Cheng | 473/266 |
| 2009/0260426 A1* | 10/2009 | Lieberman et al. | 73/65.01 |
| 2009/0298649 A1* | 12/2009 | Dyer et al. | 482/4 |
| 2010/0022351 A1* | 1/2010 | Lanfermann et al. | 482/1 |
| 2011/0044602 A1* | 2/2011 | Lim et al. | 386/224 |
| 2011/0098109 A1* | 4/2011 | Leake et al. | 463/30 |
| 2011/0195779 A1* | 8/2011 | Lau | 463/31 |
| 2011/0267344 A1* | 11/2011 | Germann et al. | 345/420 |
| 2012/0183939 A1* | 7/2012 | Aragones et al. | 434/247 |
| 2013/0190658 A1* | 7/2013 | Flaction et al. | 600/595 |

\* cited by examiner

| | |
|---|---|
| 501 | Select emulation application. |
| 503 | Display a menu of object motions for emulation. |
| 505 | User selects an object motion to be emulated. |
| 507 | The selected motion is displayed on display 105. |
| 509 | System 100 provides calibration. |
| 511 | Motion capture apparatus 101 transmits data relative to the user's position to computer 103. Computer 103 utilizes the reference points captured to scale the captured subject representation to the object representation. |
| 513 | Computer 103 calibrates the scaled subject. |
| 515 | Subject chooses a reference standard to be measured against. |
| 517 | The first object image of the motion is displayed. |
| 519 | When subject position coincides with the object position, the composite image is highlighted. |
| 521 | Advance the object motion to the next frame set in the sequence. |
| 523 | Computer 103 determines that the subject or user has successfully emulated the last image in the object motion sequence. |
| 525 | Display summary. |

FIG. 5

| | |
|---|---|
| 601 | Create a new subject profile. |
| 603 | The subject is requested to assume a first predetermined posture displayed on display 105. |
| 605 | The subject repeats the predetermined posture for a predetermined number of times. |

FIG. 6

| | |
|---|---|
| 701 | Displays a positional guide to the subject. |
| 703 | Subject is positioned in front of motion capture apparatus. |
| 705 | Capture a digital representation and video representation of the subject. |
| 707 | Constructs a mirror image representation. |
| 709 | Scale and display the mirror. |
| 711 | Superimpose on the displayed mirror image a transparency of the subject. |
| 713 | Displaying a figure to illustrate a predetermined test posture. |
| 715 | Computer 103 indicates subject is in a predetermined placement. |
| 717 | Displays a visual representation for emulation to the subject. |
| 719 | Display a mirror image in alignment with the visual representation when the subject has correctly adjusted his posture. |
| 721 | Computer 103 initiates a first test. |
| 723 | Collect and store subject positional data and subject images. |
| 725 | Determine a subject center of gravity (COG) for each frame. |
| 727 | Displays a representation of each subject COG superimposed on the mirror image. |
| 729 | Select a subject COG as a reference. |
| 731 | Calculate frame vectors at step. |
| 733 | Calculates and store frame sway angles. |
| 735 | Determine a sway index angle. |
| 737 | Calculate and store lengths of a vectors between a reference COG and the subject COG of each frame. |
| 739 | Determine a sway index position. |
| 741 | Average sway index angles and averages sway index positions. |
| 743 | Display a results summary. |

FIG. 7

METHOD FOR INTERACTIVE TRAINING AND ANALYSIS

RELATED APPLICATIONS

This application claims priority from U.S. patent application Ser. No. 61/562,494 filed on Nov. 22, 2011.

FIELD

The present invention pertains to motion capture systems and methods, in general, and to motion capture systems and methods to capture, display, and process data representative of a subject emulating or imitating an object in real time, in particular.

BACKGROUND

People improve skills through an iterative process often cluttered with peer suggestions, presumptions and lore. For those who hire instructors, the process may be faster, but it's also more expensive. In both cases, those learning typically interpret suggestions, instructor comments or video analyses. They then convert the perceptions to action. New habits are formed after extended repetition of those refined motions. With effort, the altered motions reflect desirable changes and better performance. For most of us—with or without an instructor—the process is painfully slow.

Taking instruction from someone is not easy, particularly where precision or particularized motion is required. Add complexity of any sort and the difficulty increases. When one's goal is to create habits of the newly refined motor skill, the task is complicated further. Pictures or video can simplify the process, but the task remains difficult.

Video capture and playback of a user performing a physical activity or motion is often used to train users to perform and/or refine specific motions or activities. Such use is supported by research, which has shown that systematic video presentation of visual cues can improve motor skill development. Golf instructors, for example, use video tools to display a student's swing relative to a professional's, pointing out similarities and differences during their critiques.

Such tools have limits. Among them: 1) the user passively watches the captured video, comparison or analysis after execution; 2) third parties, e.g., golf instructors, often conduct the analysis and explain rather than represent corrective action, explanations that users must interpret; and 3) the user must then attempt to incorporate the insights of the third party at a later time. The iterative process can be rewarding, but is also slow, imprecise, tedious and frustrating. The success of this review-and-repeat method is limited by a number of factors. The factors include user fatigue, user boredom, inability of the user to identify the ways in which his or her motion or activity differs from the ideal, and the short-term kinesthetic memory of humans.

It is desirable to provide a system and method that improves on the process of learning or improving of specific skills and motions. Further, it is desirable to provide real time comparisons. Such comparisons can be visual, data centric or both to improve the learning process.

Related to the need to provide such a system and method is the need to provide for assessment and/or rehabilitation for injuries. If the system and method facilitates comparison of a user's current motion to a motion they might desire, so much the better.

One such injury of consequence is concussion. Concussions in sports has become such a significant issue that various organizations have indicated that concussion assessments should be provided for all susceptible athletes. Ideally, susceptible athletes conduct assessments prior to participating in their respective sports to establish baseline results. Such baseline results enable post-injury assessment comparisons.

Athletic team coaches and/or team physicians must implement a concussion management program for student athlete health and to minimize associated athletic program legal liability.

Typically such assessments should include postural stability or balance assessments.

The ability to maintain stability in an erect posture is a skill that the central nervous system learns using information from passive biomechanical elements, sensory systems and muscles.

The maintenance and control of posture depends on the integrity of the central nervous system, visual system, vestibular system and musculoskeletal system. In addition, postural control depends on information from receptors located in and around the joints as well as on the soles of the feet.

The central nervous system must be able to detect and predict instability and must be able to respond to all of the inputs with appropriate outputs to maintain equilibrium of the body.

Balance assessments, particularly when baseline data is available, represent one of many factors qualified healthcare professionals will use in concussion evaluations.

Video and playback of a user performing a physical activity or motion as well as postural stability or balance assessment can use advantageously motion comparison and analysis.

Unfortunately, motion comparison and analysis in existing tools requires individuals skilled in interpreting image difference through visual cues, frame by frame video comparison, and both activity specific experience and expertise. Further, access to comparative video content, specialized video capture equipment, and qualified evaluation expertise can be time, cost, and alternative limited.

One problem with existing alternatives in the market for comparing a user's motion with an ideal motion is that no existing product allows the user to watch his or her own motion in real-time as they mimic an ideal motion.

Existing alternatives are hampered in their effectiveness by providing video analysis tools viewed by users after motion recording, i.e., video analyses and motion comparisons; requiring carefully placed and monitored sensors to gather data; relying on graphical, stylized, or generalized anatomical physiology representations of user motions, or other augmentations; requiring the presence of experts or the delivery of expert review; or combinations of these factors that delay visual feedback.

SUMMARY

In various embodiments of the invention, apparatus and methods are provided that can display selected predetermined postures or predetermined motions on a frame-by-frame basis or as a continuous motion for imitation or emulation by a system user or subject to, for example, learn the motion or posture, or to be guided in rehabilitation from a trauma, surgery or other injury, or to permit comparison of the users posture or motion to a baseline posture or motion for purposes of analysis or diagnosis.

One embodiment comprises a database containing images and data of at least one stored object motion. The database is coupled to a computer. The embodiment further comprises a capture system configured to transmit a subject motion to the computer. The computer is programmed to scale a defined parameter common to the subject motion and the object motion, calculate compliance between the subject motion and the object motion relative to the defined parameter, and create a composite overlay from the subject motion and the object motion. The embodiment also comprises a display to display, in real time, the composite overlay.

The stored object motion comprises data for predetermined motions across a range of age, health, and condition.

A display provides selectable backgrounds behind the subject.

In one embodiment, a method is provided for determining compliance of a subject motion to an object motion. The embodiment comprises providing a motion capture apparatus capable of motion detection, providing a display; providing a memory or storage comprising at least one object motion; providing a computer programed to communicate with the motion capture apparatus, the display, and the memory or storage; operating the motion capture apparatus and the computer to capture and store a subject motion; operating the computer to scale subject motion and the object motion relative to a defined parameter common to both the subject motion and the object motion, calculating a degree of compliance between the subject motion and the object motion, generating a composite overlay of the subject motion and the object motion, and displaying the composite overlay and degree of compliance in nearly real-time.

One embodiment comprises: selecting one of a predetermined object in one of a plurality of predetermined positions and the predetermined object in motion, displaying to a subject a visual representation of the selected predetermined object in one of a plurality of predetermined positions and the predetermined object in motion; capturing video and data representations of the subject imitating the selected predetermined object in one of a plurality of predetermined positions and the predetermined object in motion; and utilizing the data representations of the subject in combination with data representations of the one of a predetermined object in one of a plurality of predetermined positions and the predetermined object in motion.

An embodiment may further comprise utilizing the data representations to determined posture or postural stability of the subject.

An embodiment may further comprise comparing the data representations of said subject to data representations of one of a predetermined object in one of a plurality of predetermined positions and the predetermined object in motion to generate comparison data.

An embodiment may further comprise utilizing the comparison data to compute postural stability of the subject; scaling the video and data representations of the subject to the video and data representations of the predetermined object; displaying the scaled video representation of the subject with the predetermined object in real time; and utilizing the comparison data to compute postural stability of the subject.

The method may comprise capturing video and data representations of the subject in one of a plurality of predetermined positions and the subject in motion, and utilizing the captured video and data representations of the subject as the predetermined object in one of a plurality of predetermined positions and the predetermined object in motion.

The method may further comprise utilizing the comparison data to compute postural instability of the subject.

The method may further comprise utilizing the captured data representations of the subject to determine centers of gravity for said subject; and utilizing the centers of gravity for the subject to compute postural instability of the subject.

The method may further comprise initially capturing simultaneous video and data representations of the subject in one of a plurality of predetermined positions and in motion; storing the initially captured video and data representations; and utilizing the stored initially captured video and data representations of said subject as the predetermined object in one of a plurality of predetermined positions and the predetermined object in motion.

The method may further comprise utilizing the data representations to calculate sway index angles and sway index positions for the subject.

A further embodiment may comprise providing motion capture apparatus operable to capture three-dimensional video and data representations of a subject on a frame-by-frame basis; locating a subject in front of the motion capture apparatus; having the subject maintain each of a plurality of predetermined postures each for a predetermined period of time; and utilizing the motion capture apparatus to capture simultaneous video and data representations of the subject on a frame-by frame-basis.

The method may further comprise automatically determining a subject center of gravity (COG) for each frame of the frame-by-frame data representation; selecting for each posture of the predetermined postures a COG for a predetermined frame of data as a reference COG for each of the predetermined postures; utilizing the reference COG to determine a reference vector for each of the predetermined postures; utilizing each COG for each frame of data to calculate a frame vector; automatically determining and storing a sway angle between the reference vector and each frame vector; determining standard deviations of each sway angle during each predetermined period of the test to represent a sway index angle; automatically averaging sway index angles for all of the frames for each predetermined posture; and providing a results summary comprising the averaged sway index angles.

The method may further comprise: automatically calculating and storing for each frame the length of a vector between the location of the reference COG and the location of the subject COG of the frame; automatically determining a standard deviation of each vector length to represent a sway index position; averaging the sway index position for all of the frames for each predetermined posture; and providing the results summary comprising the averaged sway index positions.

The method may further comprise: displaying a mirror image of the subject as captured by the motion capture apparatus; displaying a visual representation to the subject to illustrate one of a predetermined plurality of predetermined test postures for the subject to emulate or imitate.

The method may further comprise displaying a visual representation to the subject for each of the predetermined postures.

The method may further comprise utilizing the motion capture apparatus to collect and store video representations of the subject on a frame-by-frame basis; displaying a visual representation to the subject for each of the predetermined postures; generating composite visual representations of the subject and video and data representations of a predetermined object; displaying a composite of the subject and a video and data representation of a predetermined object; and displaying either the subject or object representation as one of a transparent and semitransparent image overlay.

In a further embodiment, a method comprises displaying a visual representation of a predetermined object; instructing a subject to imitate the position of the object; capturing video and data representations of the subject; generating a composite representation of the predetermined object visual representation and the visual representation of the subject; and comparing the data representation of the subject and the data representation of the predetermined object to generate comparison data.

Yet a further embodiment comprises displaying a visual representation of a predetermined object in motion; capturing video and data representations of a subject in motion imitating the object in motion; generating a composite visual representation of the predetermined object visual representation and the subject visual representation; and comparing the data representations of the subject in motion and data representations of the predetermined object in motion to generate comparison data.

A further embodiment comprises displaying a visual representation of a predetermined object in a predetermined position; capturing video motion representations and data representations of a subject imitating the predetermined object in the predetermined position for a predetermined time period; generating a composite visual representation of the predetermined object visual representation and the subject visual representation; and comparing the data representations of the subject and data the predetermined object to generate comparison data.

A further method comprises sequentially displaying visual representations of a predetermined object in a plurality of predetermined positions; capturing video and data representations of a subject imitating the predetermined object in each of the predetermined positions; generating a composite visual representation of the predetermined object visual representation in each of the predetermined positions and corresponding ones of the visual representations of the subject; and comparing the data representations of the subject and data representations of the predetermined object to generate comparison data.

A further method comprises displaying a visual representation of a predetermined object; instructing a subject to imitate the position of the object; capturing video and data representations of the subject; generating a first composite representation of the predetermined object visual representation and the visual representation of the subject; and comparing the data representation of the subject and the data representation of the predetermined object to generate first comparison data.

One embodiment of a method of operating a system comprising a motion capture apparatus operable to capture video and data representations of a subject, and a computer in communication with said motion capture apparatus is provided. The method comprises: capturing on a frame-by-frame basis three-dimensional video and data representations of a subject attempting to maintain each of a plurality of predetermined postures each for a predetermined period of time; providing one or more programs executable by the computer. The one or more programs are executed by the computer such that the computer utilizes the data representations to calculate postural stability of the subject.

The one or more programs executed by the computer causes the computer to automatically calculate sway index angles and sway index positions for the subject.

The one or more programs executed by the computer cause the computer to compare previously calculated postural stability of the subject with currently calculated postural stability of the subject.

In an embodiment of a system in accordance with the principles of the invention, the system comprises motion capture apparatus. The motion capture apparatus is operable to capture video and data representations of a subject and to identify a plurality of predetermined points on the representation of the subject. The system comprises a processor coupled to the motion capture apparatus and a memory coupled to the processor. The database stores predetermined video and data representations of an object. The system further comprises a display coupled to the processor. The system comprises one or more programs executable by the processor such that the processor displays the predetermined visual representation on the display, instructs a subject to imitate the position of the object, captures video and data representations of the subject via the motion capture apparatus, generates a composite visual representation of the subject and the representation of the predetermined object, displays the composite visual representation, and compares the data representation of the subject and the data representation of the predetermined object to generate comparison and/or compliance data.

The one or more programs may further be executable to calculate compliance between the subject motion and the object motion relative to a defined parameter.

A further embodiment is one or more application programs executable by a computer in conjunction with a motion capture apparatus, such that the computer displays a predetermined visual representation on the display, instructs a subject to imitate the position of the object, captures video and data representations of the subject via the motion capture apparatus, generates a composite visual representation of the subject and the representation of the predetermined object, displays the composite visual representation, and compares the data representation of the subject and the data representation of the predetermined object to generate comparison and compliance data.

BRIEF DESCRIPTION OF THE DRAWING

The invention will be better understood from a reading of the following detailed description of several embodiments in conjunction with drawing figures in which like reference designators identify like elements, and in which:

FIG. 5 illustrates method steps;
FIG. 6 illustrates method steps;
and
FIG. 7 illustrates method steps.

DETAILED DESCRIPTION

Game systems and software are commercially available that allow the user to interact with the software by moving his or her body and/or appendages. The systems employ motion capture apparatus. The motion capture apparatus detects and captures motion and movement of a user and a representation of the user is inserted into the game application. Typically the motion of the user is inserted into the game video as a software generated avatar. This heightens the user's feeling of immersion into the game or software application. Rather than manipulating a joystick or controller, the user moves his or her own appendages to control the game play. The motion capture apparatus "sees" the user's motion and portrays a game avatar's motion accordingly.

The motion capture apparatus comprises both hardware and software that capture video representations of a user and three-dimensional data representations of the user. The motion capture apparatus may automatically identify predetermined points on a body and utilize those predetermined points to determine movements of the body and its appendages. The motion capture apparatus provides the video representations and three-dimensional data representations as outputs.

As used herein, the term "subject motion" is used to refer to a user's physical motion that is captured for the purpose of comparative analysis, and displayed as an element of a composite image.

As used herein, the term "object motion" indicates a stored motion against which comparisons are made, and displayed as an element of the composite image. The stored motion is previously captured to produce the related activity. The stored, previously captured motion may, in various embodiments depend on the topic, for example, be that of a professional athlete, a physical trainer, a musician, or in some instances the user's previously recorded motion.

The term "frame" of either the subject motion or the object motion indicates the data and image from a select time sequence of a captured motion. When frames of either the subject motion or the object motion or both are sent to a display for viewing and/or emulation, such frames are referred to as a subject frames or images, or object frames or images.

The term "frame region" refers to a subset of a discrete frame referenced using a specific mathematical coordinate system.

The term "composite image or composite overlay" indicates the result of combining the data and image from a discrete frame of the subject motion with the data and image from a discrete frame of the object motion (figuratively, an overlay of one over the other).

The term "real-time" indicates that the speed the system updates composite images and calculations is at a rate that a user may perceive as relatively continuous and instantaneous, or at least at a rate that makes delays in updates virtually imperceptible.

Figure 1:
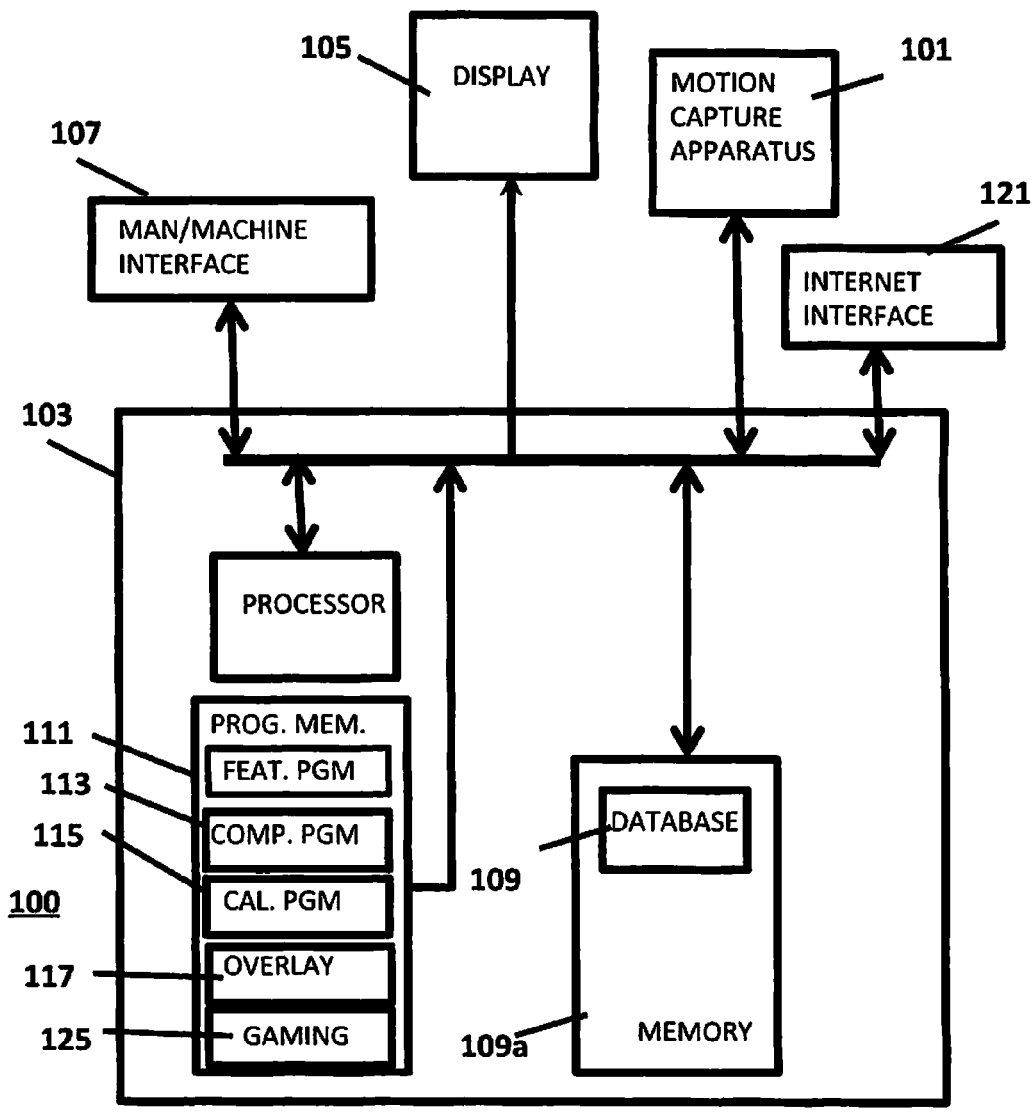
FIG. 1 is a system block diagram.

Turning now to FIG. 1, system 100, comprises motion capture apparatus 101, a computer 103 coupled to the motion capture apparatus, a display 105 coupled to computer 103, and a man-machine interface 107 coupled to computer 103.

Motion capture apparatus 101 may be one of several commercially available units. Motion capture apparatus 101 utilizes a depth sensor, at least one camera and an electronics module to track movements of objects and individuals in three dimensions and to provide full-body three dimensional motion capture. The depth sensor typically comprises an infrared laser projector combined with a sensor, which captures video data in three dimensions under any ambient light conditions.

Two-dimensional capture yields motion into, through and out of a flat frame of reference, including side-to-side and up-down motions. The third dimension capture includes motion forward-and-backward within the frame. Captured data includes angles orthogonal to the capture system's primary frame of reference.

Motion capture apparatus 101 is operable to provide digital images and to convert the digital images to digital data in a predetermined format pre-staged for analysis. At least a portion of the analysis is provided by motion capture apparatus 101 in various embodiments. Computer 103 comprises a memory or storage 109a. Memory or storage 109a comprises a database 109 that in turn comprises captured video and data representations for at least one object.

Computer 103 comprises a comparison program 113 stored in program memory 111 and executable to produce a comparison of the captured subject motion with a selected object motion stored in database 109. Computer 103 utilizes the comparison to produce a composite overlay for display on display 105. The resulting composite overlay contains data in all three physical dimensions that may also be referenced in a time sequence on a frame-by-frame basis.

System 100 is useful to train participants and users in many fields of endeavor. Sports and musical performance in particular benefit from repetition of complex motions; a baseball player trains to emulate a famous hitter's swing, while a violinist trains to emulate a famous musician's bow stroke.

System 100 includes applications to a wide range of endeavors, including other precise mechanics-oriented sports such as baseball, softball, golf, basketball shooting, volleyball, tennis, table tennis, badminton and squash to name a few. System 100 may include activities that have specialized techniques such as in power lifting, martial arts, tai chi, and yoga.

In all applications, system 100 permits a user to see how his subject motion compares to an object motion.

System 100 is operable to store captured video and data representations of a subject or user in database 109. This provides the capability to create subject specific one or more "physiological performance baselines", each of which indicates a user recorded protocol for mental and physical tests.

System 100 may also be utilized in medical rehabilitation for trauma survivors. A stroke victim, for example, can retrain his muscles to regain lost functionality.

In a representative application for athletic training a user first selects one object motion from a plurality of object motions. For example, the user may select Ted Williams' baseball swing. After making the selection, the user watches a recording of Ted Williams' baseball swing.

When the user is ready, the user stands before a motion capture apparatus 101.

A calibration sequence is initiated. In the calibration sequence, motion capture apparatus 101 and computer 103 identify and measures the user's height, arm length, etc. to scale the user's subject motion to the object motion.

Computer 103 displays an object image first discrete frame from the object motion sequence.

The subject or user mimics the object image in the first frame. When the subject or user has mimicked the object image with a predetermined degree of compliance, computer 103 displays the next object image in the sequence. This process continues until the user mimics each object image in the sequence with a sufficiently high degree of compliance to satisfy a preselected threshold of a chosen standard.

The term "reference standard" or "standard" indicates how strictly the user's motion will be assessed relative the object motion. A high standard has narrow parameters, which dictates that the subject motion must closely resemble the object motion. Conversely, a low standard has wide parameters, which dictates that the subject only generally resemble the object motion. Once calibration is complete, calculations will determine if user achieved success (relative the standard). When possible, the standard names are expressed in language familiar to the selected sport or field of endeavor. Using the parlance of baseball, the standards include 'coach-pitch', 'little league', 'high school', 'collegiate', 'semi-pro', etc. As implied by the standard names, the parameters become more rigorous. Metrics within the standards include degree (%) of compliance (defined below) and consecutive days achieving a given standard.

Subject-object motion compliance or degree of compliance is an indication of the similarity of a subject motion to an object motion relative a reference standard. The system calculates and presents the degree of compliance for individual frames, series of frames, and the sequence as a whole. Expressed as a percentage, it tells the user how close he is to mimicking the object motion.

Figure 2:
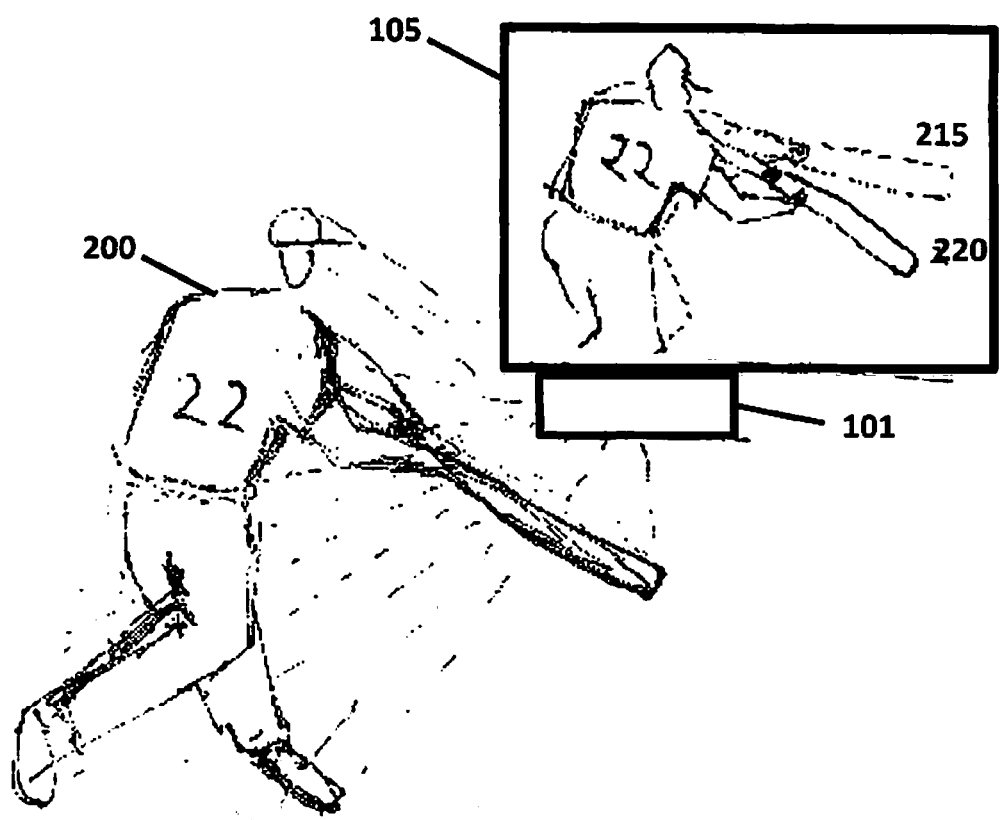
FIG. 2 depicts use of the embodiment of FIG. 1.

FIG. 2 illustrates one embodiment of system 100 in use. In this embodiment, a user or subject 200 watches images 215 of an object on display 105 that, along with data, have been combined by computer 103 into a composite overlay displayed by display 105.

Subject 200 sees a composite image, which combines a representation 220 of himself in real time overlaying a displayed object motion 215 that he attempts to emulate or imitate. The composite overlay shown on display 105 reveals the motion similarities and differences so they are readily visible.

In this example, the subject or user 200 desires to improve his baseball bat swing. Motion capture apparatus 101 captures data and video images of subject or user 200 as he swings a bat. The captured data and images are provided to computer 103. Computer 103 displays the subject or user as subject image 220 on display 105. In this embodiment, subject image 220 is displayed as a solid monochromatic outline. Object image 215 is coincidentally displayed on display 105. Object image 215 is displayed as a dotted monochromatic outline. Similarities and differences in the subject image 220 and the object image 215 are readily apparent to the user. To reflect partial emulation, the composite overlay of the subject images 220 and the object images 215 begin merging. Where the subject image 220 and object image 215 diverge, the body positions of the subject or user 200 and the individual being emulated represented by object image 215 differ, i.e., the images 220, 215 do not align.

Figure 3:
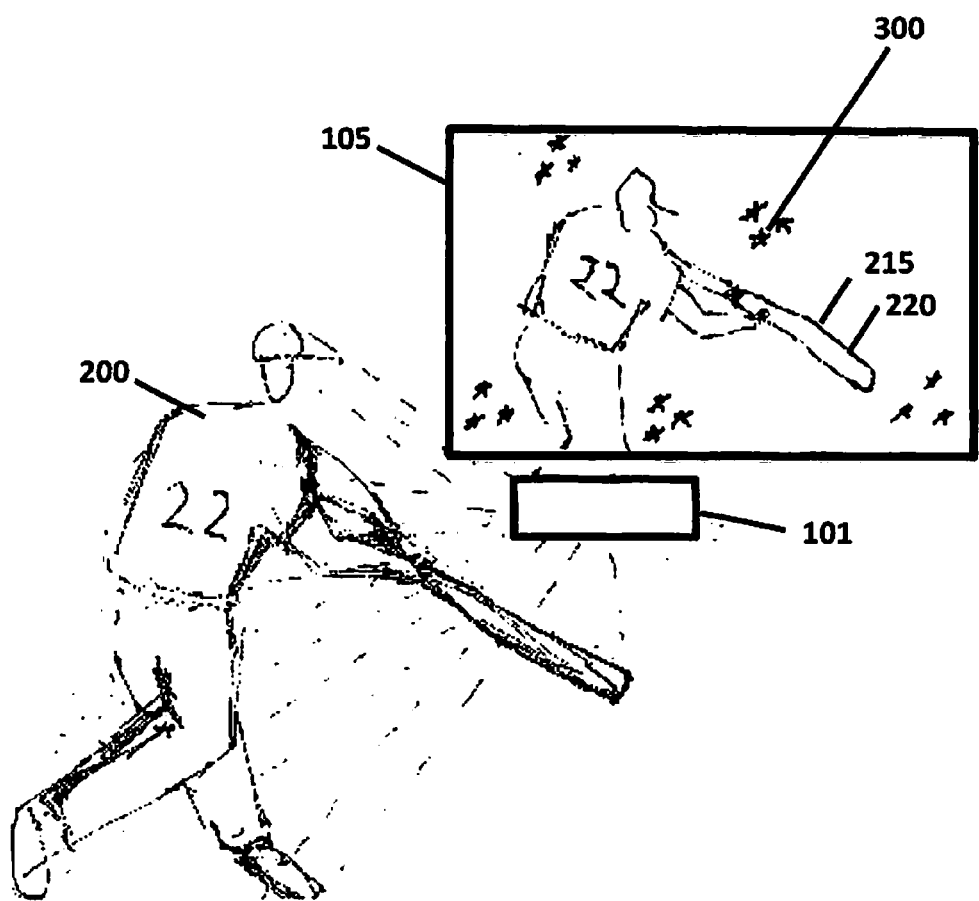
FIG. 3 further depicts use of the embodiment of FIG. 1.

FIG. 3 depicts a variation of the embodiment of FIG. 2. Again, user or subject 200 watches images 215 of the object on display 105 that, along with data, have been combined by computer 103 into a composite overlay. This time, however, the image 220 of the user's swing is perfectly synchronized with the object motion 215. The composite of user and object motions appear as one.

Composite image 215 and 220 reveals no differences in the body positions of the user 200 and the motion being emulated. Emulation of this stage of the object motion is complete as denoted by stars 300 shown on display 105.

Motion capture apparatus 101 captures video representations and data representations on a frame-by-frame basis. By capturing the video representations of the object with motion capture apparatus 101, the object motion may be played back and displayed on a frame-by-frame basis.

In one embodiment, system 100 displays one frame of the object motion so that the object is in a static posture. The subject can then emulate or imitate the static posture. System 100 using motion capture apparatus 101 captures the position of subject 200. When subject 200 is in a static posture that coincides with the displayed object, system 100 advances the frame of the displayed object. System 100 may skip a predetermined number of frames. Emulating or imitating various static postures may enhance the learning of the object's motion by subject 200. Once subject 100 has correctly emulated or imitated each selected static position, the process may be repeated. The process may be repeated a number of times. Once the subject feels that he has learned the static positions, system 100 may then display the object in continuous motion. The continuous motion may be at slow speed until subject 200 emulates the motion in dynamic coincidence with the object motion. The speed of the object motion may then be increased to full speed.

For each frame, system 100 displays a green image outline superimposed on the displayed image 220 of the user when the user's batting swing mimics the object swing to provide positive reinforcement.

In addition to the user receiving positive reinforcement from the green image outline when the user's batting swing mimics the object swing, the user is able to see when his swing is out of synch with the object swing.

The training starts at a slow tempo to simplify learning the mechanics of the motion.

Progression to higher tempos may be controlled by an affirmative user selected choice or by a system-driven auto-progression to higher tempos upon successful lower tempo compliance.

After instruction on timing cues, the user works on swing timing by swinging at computer-generated virtual pitches.

While the user focuses on hitting virtual pitches, system 100 generates degree of compliance scores to reveal how the swing breaks down under the pressure of accelerated or repetitive performance compared to that of the object motion.

Figure 4:
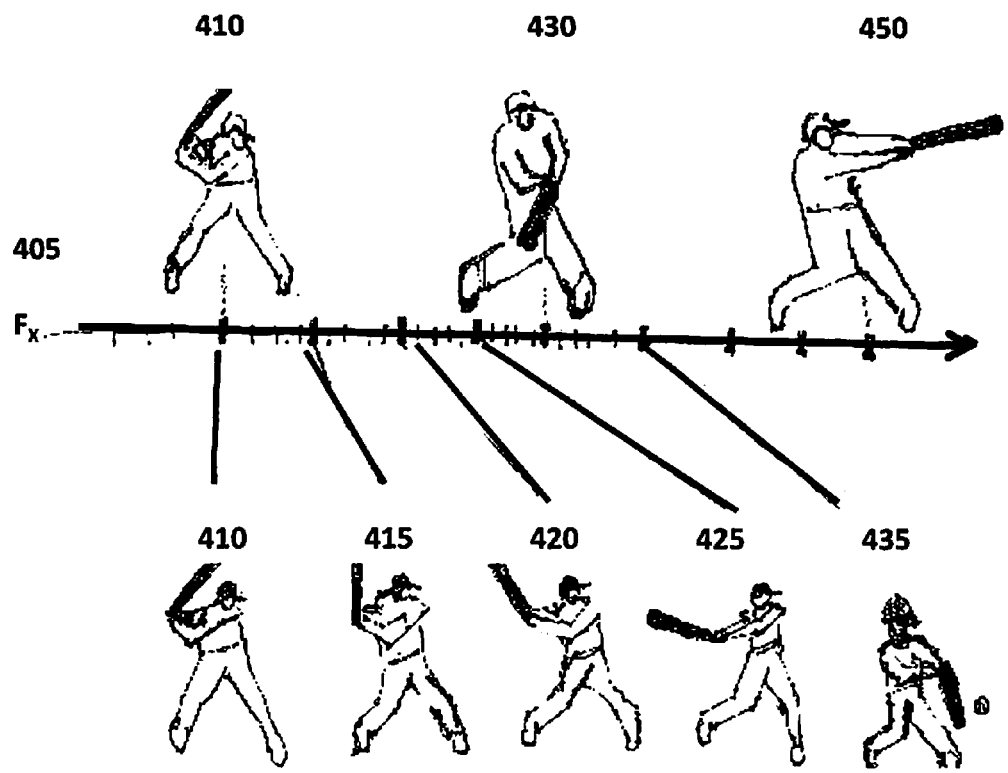
FIG. 4 is a frame-by-frame sequence.

FIG. 4 illustrates a representative frame-by-frame sequence of a motion for a detailed presentation of a portion of the object motion. Initially, subject 200 is shown object frame 410. Once subject 200 correctly obtains a static posture in coincidence with the static posture shown in frame 410, system 100 advances to frame 430 and displays frame 430 to subject 200. Once subject 200 correctly obtains a static posture in coincidence with frame 430, system 100 advances to frame 450 and displays frame 450 to subject 200. The intermediate frames, shown representatively by frames 415, 420, 425 and 435 are skipped in this process. However, when full motion of the object is to be displayed, all frames are shown in sequence to provide a full motion video.

If the subject 200 achieves low compliance with frame 430, then intermediate frames 415, 420, 425, 430, 435 are displayed at a tempo appropriate for seamless integration to help raise the compliance score the subject or user achieves at frame 430.

Computer 103 may provide displays of the sub-frame progression at a much slower pace than the pace of the primary frame progressions. The sub-frame progressions can then be speeded up to allow seamless integration with the primary sequence progressions. This raises compliance scores for a section of the motion sequence and will raise the compliance score for the motion sequence as a whole.

System 100 is operable to selectively compare a user's real-time motion to pre-stored object motion sets stored in database 109. Pre-stored object motion sets stored in database 109 may include:

- an "ideal" motion for a desired action as produced by a computer model; motions from recognized practitioner experts, such as, for example, athletes, musicians or others;
- motions associated with interim steps of a progressive learning curve and/or motions necessary to rehabilitate muscle sets toward desired motions, e.g., motions that isolate selected muscles or rehabilitative limited range of motion exercises;
- varietal stored motions for situations in which there is no single "ideal" motion, e.g. a flat or upright golf swing and/or;
- a subject's previous use of the system.

System 100 helps users learn and consistently perform a particular motion in near real time through repeated comparison and adjustment. Third party expertise is not required.

System 100 also may provide an objective basis for real-time motion comparison. Such evaluations may be conducted by the subject or by an evaluation expert, whether or not the subject and evaluator are in the same physical proximity.

Turning now to FIG. 5, an overview of the operation of system 100 is shown. At step 501, a user selects an emulation application. Man-machine interface 107 is utilized to select the specific application.

Computer 103 sends a menu of object motions to display 105 and/or man-machine interface 107.

At step 503, a menu of object motions for emulation is displayed on display 105. The menu includes a selection of object motions for emulation. For example, the selection comprises a professional's motion, a computer model of an "ideal" motion, or a previously recorded subject or user motion.

Using man-machine interface 107, the user selects an object motion to be emulated at step 505.

At step 507, the selected motion is displayed on display 105 in a fluid, full speed video clip. In various embodiments, the video clip may be repeated in slow motion to help the user see motion nuances. The motion may also be presented as a series of discrete frames 410, 430, 450 as illustrated in FIG. 4. Presented in sequence, the frames unmistakably resemble the ideal motion.

System 100 provides a calibration step 509. The subject or user receives directions for being positioned at an optimal location in front of motion capture apparatus 101.

Motion capture apparatus 101 transmits data relative to the user's position to computer 103 as it detects specific reference points and isolated movements at step 511. The captured reference point data may include the user's stance, height, body width, extended arm length, and movements like jumps, turns, vertical and/or horizontal arm movement, etc. Computer 103 utilizes the reference points captured to scale the captured subject representation to the object representation.

Computer 103 compares data and/or images representing the scaled subject compared to object motion data, to calibrate the scaled subject motion enable appropriate calculation and overlay in real time and/or subsequent analysis at step 513. Computer 103 processes the physical attributes data to scale the anticipated subject motion to dimensions appropriate for the selected object motion.

Calibration step 513 provides the basis for meaningful visual comparisons of the subject and object motions that follow. Calculations are performed and scalar elements are identified. Object motion is stored in layered and interlaced data arrays relative to a variable time scale.

For each frame of subject motion captured, the scalar reference allows for comparison against the object motion such that motion, rather than physiology, is the primary focus of comparison.

Computer 103 executing calibration program 115 performs calculations for each discrete frames captured for the subject motion. Calibration anticipates subject motion relative to object motion, enabling more efficient real-time computation by the computer 103 and the comparative analysis that follow.

Position and movement variations beyond relative physical size as a result of significant physiological difference of subjects and objects require adaptation. Such differences between a subject and object may occur due to age, fitness, injury, handicap, or other factors. For instance, the position and axis of movement for a wheel chair bound user cannot directly mimic those of a standing person.

Calibration program 115, calibration allows computer 103 to scale the captured representations of the subject motion such that the composite overlay exhibits the nearest possible geometric similarity between the object motion and the subject motion.

The user or subject may select specific parameters common to the subject motion and object motion that system 100 uses to scale and compile the composite overlay. Such possible parameters include arm length, height, distance between feet, etc.

As briefly described above, system 100 uses object motion data from a variety of sources as baselines for comparison. In addition, object motion data for professional/ideal, standard and other representative capabilities across a range of age, health, and physical conditions are stored in database 109.

Object motions stored in database 109 are stored in predefined coordinate systems consistent with the premise that fundamentally, all physiological motion is defined as rotational, translational, or a combination of the two. Combined coordinate systems yield multiple dimensions, and may be further layered in time by sequential frame-by-frame motion capture. Computer 103 measures motion against these predefined coordinate systems. The predefined coordinate systems may be Cartesian, orthogonal, polar, or other spatial coordinate systems.

Z-buffering and/or other computer graphic mechanisms are utilized to render image depth. Computer 103 maintains the image depth layer in a data array arrangement in database 109.

By way of example, Cartesian coordinates are used for the motion of hands on a piano keyboard or other instrument and polar coordinates are used to measure a golfer's swing, or the swing of another athletic instrument such as a baseball bat or tennis racket.

System 100 uses motion capture, calibration and coordinate systems to affect motion comparison.

A two dimensional, i.e., X-Y, coordinate system alone is insufficient for the comparison of physiological motion.

System 100 utilizes a three dimensional coordinate system, i.e., x, y, z coordinates, for the required depth through the selection of coordinate systems. Data matrices or arrays are utilized to provide layering. Providing layering permits connecting data points on one layer or on multiple layers to create an orthogonal axis or axes, including simultaneous movement across multiple axes or reference coordinate systems, or motion within the plane of engagement across time (the discrete frame).

At step 515, the subject or user chooses a reference standard to be measured against and again views on the display 1055 the object motion at full speed, in slow motion, or as a selected series of discrete frames.

At step 517 computer 103 displays on display 105 the first object image of the motion he chose to emulate.

Computer 103 also displays the subject image on display 105.

The subject image and the object image are each presented such that they are readily distinguishable. By way of example, the images may be presented in different color, outline, or transparency. This is shown in representative fashion in FIG. 2 where subject image 220 has a solid outline and object image 215 is show in dotted outline.

Computer 103 executing overlay program 117 creates a composite overlay of the subject motion and the selected object motion.

At step 517, the subject or user views the composite overlay in real time permitting him to "see" how adjusting his position helps him emulate or imitate the position of the object image. When, at step 519, the subject position coincides with the object position, the composite image is highlighted to signal to the subject that he or she is in coincidence with the object image position After the subject or user succeeds in getting his position to sufficiently coincide with the position of the object image, the subject image overlaying the object image and the object image coincide. Accordingly subject and object images displayed form a composite of one.

With the first frame of emulation or imitation completed, computer 103 advances the object motion to the next frame set in the sequence and the process begins again. In this manner, the process repeats itself through all frames of the object motion unless interrupted.

At step 523, computer 103 determines that the subject or user has successfully emulated the last image in the object motion sequence.

Computer 103 calculates an emulation summary and displays it on display 105 and/or prints it out on a printer that is not shown.

The emulation summary includes how well the user's subject motion corresponds to the object motion. More specifically the emulation summary comprises a compilation of "subject object motion compliance" and/or "degree of compliance" scores. In addition, computer 103 may also retrieve from memory 109a predetermined recommendations for improvement.

The term "subject-object motion compliance" or "degree of compliance" indicates the similarity of the subject motion and the object motion relative a reference standard. Computer 103 calculates and presents the degree of compliance for individual frames, series of frames, and the sequence as a whole. Expressed as a percentage, it tells the user how close he or she is to mimicking the object motion.

System 100 can present the subject or user with additional options. The user options include exiting the program, repeating the emulation, repeating the emulation at greater or slower speed, changing the standard, or improving the low score sections of users motion to improve his overall compliance score. If the subject or user chooses to repeat the emulation at a more rigorous standard, finer points of the object motion become more critical to achieving emulation.

Additional selective options presented in a menu to the subject or user of system 100 permits selection of frame regions of discrete component portions of motion such as, for example, wrist, arm, shoulders or leg motion.

Each frame region is presented in turn; the user must mimic each mechanical component of the frame region before system 100 will present the next one.

When combined, the frame regions compose the ideal motion. The user sees how his body position(s) mimic or differs from the ideal motion, allowing the user to understand and make adjustments to the mechanics of his motion.

System 100 can capture and store the motion of a subject. One advantageous use of the stored motion is for playback at a future date to show progression of improvement in learning a skill or to observe therapy progression.

A particularly advantageous use of capture and storage of the motion of a subject is to use the captured motion as a baseline or object motion for future comparison and analysis with newly captured subject motion.

One specific application of system 100 that utilizes captured and stored subject motion is concussion assessment.

Professional football players create a type of baseline now that medical professionals use to evaluate whether they have suffered concussions.

In addition to football, concussion potential activities ripe for participant-specific baselines include auto racing, bicycle racing, bobsledding, gymnastics, lacrosse, ice hockey, luge, rock climbing, skiing, snowboarding, soccer, speed skating, and springboard diving, to name a few.

System 100 permits creation of objective standards for a suspected concussion incident evaluation by a medical professional.

Typically such assessments should include postural stability or balance assessments.

It is desirable that postural stability assessments include a comparison with a baseline assessment for each individual athlete.

When creating baseline assessments for whole teams of athletes, logistics issues exacerbate the problem beyond the choice of low cost subjective versus prior costly objective solution. Currently, individuals administer balance assessments by visual observation under the guidance of an athletic team coach or team physician.

System 100 is operable to provide objective, low cost postural stability or balance assessment that may be utilized in determining concussion.

The ability to maintain stability in an erect posture is a skill that the central nervous system learns using information from passive biomechanical elements, sensory systems and muscles.

The maintenance and control of posture depends on the integrity of the central nervous system, visual system, vestibular system and musculoskeletal system. In addition, postural control depends on information from receptors located in and around the joints as well as on the soles of the feet.

The central nervous system must be able to detect and predict instability and must be able to respond to all of the inputs with appropriate outputs to maintain equilibrium of the body.

Balance assessments, particularly when baseline data is available, represent one of many factors healthcare professionals will use in concussion evaluations.

Posture can be defined as the relative arrangement of different parts of the body with line of gravity.

In static postures, the body and its segments are aligned and maintained in certain positions.

A dynamic posture refers to postures in which the body or its segments are moving.

A human's center of gravity (COG), which is sometimes referred to as the body's center of mass, is located within the body approximately at the second sacral segment, a location that is relatively distant from the base of support. The human base of support (BOS) is defined by an area bounced by the tips of the heels and by a line joining the tips of the toes.

Two different calculations are generally used to locate the center of gravity of an individual.

The precise location of the center of gravity depends on an individual's anatomical structure, the individual's habitual standing posture, the individual's current position, and whether external support is provided. The location of the center of gravity remains fixed as long as the body does not change shape.

One method for determining the center of gravity utilizes a mass weighted sum in which the center of gravity is calculated by summing the mass-weighted positions of all of the body parts. Advantageously, motion capture apparatus 101 is operable to identify specific body parts, their length and position and can calculate a mass weighted sum for determining the center of gravity.

Another method of determining the center of gravity utilizes a fixed position determination that locates a position on the body based upon predetermined points on the body.

The body sways back and forth like an inverted pendulum, pivoting about the ankle, at quiet stance. This swaying is referred to as postural sway and is considered as having two components. One component is referred to as AP (anteroposterior) sway, and the other is referred to as ML (mediolateral) sway. AP sway is sway in the sagittal plane and is typically ~5-7 mm at quiet stance in young adults. ML sway is sway in the frontal plane and is typically ~3-4 mm during quiet stance in young adults.

A sway index may be calculated utilizing the standard deviation of the position of subject's center of gravity or by calculating a sway index angle.

The relationship between the center of gravity and the sway index position is a defined relationship. The relationship between the center of gravity and the sway index angle is similarly a defined relationship.

The sway angle of a given sample is defined as the angle between two vectors: a vector from a reference floor position and the subject's center of gravity in the first sample; and a vector from the reference floor position and the subject's center of gravity in the current sample. The reference floor position is defined as the subject's center of gravity in the first sample projected onto the floor.

System 100 may be used to determine and store a sway index for a baseline or object motion for each subject.

The baseline or object motion for concussion assessment is a pre-incident physiological performance baseline.

The pre-incident physiological performance baseline presents all aspects of the baseline protocol; objective criteria like beginning posture, range of motion measurements, and exercise detail, weights, reps etc. are presented to minimize subjectivity. The physiological performance baseline for each subject is stored in database 109 for later use in evaluation. It should be apparent to those skilled in the art that although data base 109 is shown as co-located with computer 103, data base 109 may be remotely located and accessible via the Internet or other digital access so that evaluation is possible on-site or remotely.

Where a concussion is suspected, the user attempts to mimic his previously stored pre-incident physiological performance baseline object motion.

In the instance of concussion assessment, using system 100 a user creates a pre-incident physiological performance baseline that he will attempt to emulate upon suspicion of a concussion.

Turning now to FIG. 6, the operation of system 100 to provide postural stability or balance assessment is described.

At step 601 a new subject profile is created utilizing man-machine interface 107 with subject specific data including sex, age, height weight and other relevant information.

At step 603 the subject is requested to assume a first predetermined posture as shown on display 105. The subject is to maintain the predetermined posture for a predetermined period of time.

At step 605 the subject repeats the predetermined posture for a predetermined number of times.

At FIG. 7, the method of FIG. 6 is displayed in greater detail. At step 701, computer 103 displays on display 105 a positional guide to the subject.

At step 703, the subject positions himself in front of motion capture apparatus. When the subject is in the correct postural position an indication is provided to the subject that he or she is in the correct position. The indication may be provided on display 105 or by an audible indication or any other indication communicable to the subject.

At step 705, motion capture apparatus 101 captures a digital representation and video representation of the subject, and provides the representations to computer 103 for analysis and storage.

At step 707, computer 103 constructs a mirror image representation of the captured video representation.

At step 709, computer 103 scales the mirror image and displays the mirror image on display 105.

At step 711, computer 103 superimposes on the displayed mirror image a transparency that approximates the subject's size and height in the posture described by the predetermined test.

At step 713, displaying a figure to said subject to illustrate a predetermined test posture.

At step 715, computer 103 provides an indication to the subject when the subject is in a predetermined placement in front of motion capture device 101.

At step 717, computer 103 displays on display 105 a visual representation to the subject such that the subject may adjust his posture by emulating the visual representation.

At step 719, when the subject has correctly aligned his posture to coincide with that of the visual representation, computer 103 displays the mirror image in alignment with the visual representation being emulated.

At step 721, computer 103 initiates a first test by beginning a predetermined time period. In one embodiment, the predetermined time period for each test is 20 seconds.

At step 723, computer 103 utilizes motion capture apparatus 101 to collect and store subject positional data and subject images on a frame-by-frame basis in database 109.

At step 725, computer 103 utilizes the stored subject positional data to determine a subject center of gravity (COG) for each frame of subject positional data in real time.

At step 727, computer 103 displays a representation of each subject COG superimposed on the mirror image displayed on display 105 in real time.

At step 729, computer 103 has programming to determine and store a subject COG for a predetermined frame of data as a reference COG and utilizes the reference COG to determine a reference vector.

At step 731, computer 103 utilizes the subject COG for each subsequent frame of data to calculate a frame vector.

At step 733, computer 103 calculates and stores a frame sway angle between the reference vector and each frame vector.

At step 735, computer 103 determines the standard deviation of each frame sway angle during the predetermined time period of the test to represent a sway index angle for the test.

At step 737, computer 103 calculates and stores for each frame the length of a vector between the location of the reference COG and the location of the subject COG of the frame.

At step 739, computer 103 determines a standard deviation of each vector length to represent a sway index position.

At step 741, computer 103 averages the sway index angles and the sway index position for each predetermined posture when repeated.

At step 743, computer 103 displays on display 105 and stores in memory 109 a results summary comprising the averaged sway index angles and said averaged sway index positions for the test.

Computer 743 repeats steps 701 through 743 for each test. After completing all the tests, computer 743 automatically prepares a data summary of the results of all tests, along with the previously stored results to aid qualified healthcare professionals evaluate whether the subject has suffered a concussion or once confirmed, the status of his recovery.

System 100 may also be used to help rehabilitate medical patients and trauma victims following a sports injury, accident, stroke, surgery, or other traumatic events.

If a pre-trauma baseline has been captured and stored for a patient, that pre-trauma recording may serve as an object motion in a post-trauma rehabilitation program.

At the beginning of a season, for example, a professional athlete may prepare a comprehensive physiological performance baseline motion prior to engaging in high risk activity. Assuming that the physiological performance baseline performance reflects proper form, the therapist uses it in the rehabilitation protocol.

User-administered therapy sessions can supplement those with a therapist to speed recovery and reduce rehab costs.

With Internet connectivity, the therapist-patient interaction can be handled remotely. By way of example, system 100 is provided with an Internet connection 121. System 100 may be located at one location where the patient is tested, and the Internet connection allows transmission of captured data or display data to a location where the therapist is located.

System 100 has additional applications. In one embodiment, a music student may learn to play a musical instrument by mimicking a stored object motion of a teacher or virtuoso. In such an application, where finger position and motion are to be learned, system 100 may display frame regions rather than whole frames, where the frame region contains the motion of interest.

By way of example, a guitar or piano music student first watches a recording of a teacher playing scales. The music student sits in front of a motion capture apparatus 101. Computer 103 scales the student's performance (the subject motion) to match the teacher performance (the object motion) and displays on display 105 a composite image of the student's hand and the teacher's hand in real time. When system 100 determines that the student has performed the first note in the scale with correct fingering, it transitions to an object image of the next note, etc. In this application, each test is the learning of one note.

In yet a further application of system 100, a worker can perform a job-based protocol that can later be used for training, performance, health, or safety evaluations. As with the physiological performance baseline, the worker's captured and stored motion becomes a baseline or object motion. The worker's subsequent attempt to mimic the earlier recorded protocol is the subject motion.

System 100 further comprises a gaming program 125 providing a programmable gaming mode in addition to the learning mode described. The gaming mode includes a plurality of options that are user selectable. The options in baseball/softball may include, but are not limited to, games such as hitting to the opposite field, hitting particular pitches, fouling off difficult-to-drive pitches, line drive hitting and home run hitting.

Computer 103 tabulates scores for each individual game. In addition, the degree of compliance for the last object motion emulated is also determined to reinforce correct motions through recreational activity.

The gaming mode follows existing protocols for single player, split-screen or multiplayer, i.e., online.

System 100 further comprises feature program 111 that computes layered and interlaced data arrays/matrices to relationally store discrete frames against a variable time scale; matrix/array relationships enabling comparison of multi-linear and curvilinear motion in three dimensional space by stacking or inter-relating matrix/array layers for comparison, replacement, or alteration; correlation and calibration tables; configuration/settings data tables; subject data storage templates; and analytics for direct comparison and/or factored comparison of stored captured data versus real time captured data.

Feature program 111 also comprises background images against which the the field of motion may be captured or replayed by the user, for example, a sports arena, golf course, workout room, batting cage, etc. Feature program 111 also comprises wire frame coordinate systems designed to highlight frame regions for motion comparison. Feature program 111 also permits selection of subject motion captured data to be used in place of object motion data as the baseline for comparison. Feature program 111 is executable such that a single user's subject motion may be placed simultaneously over object frames to demonstrate user progress. Feature program 111 is also selectively executable such that multiple subject identities may be displayed over an object frame for competitive gaming. The various features provided by feature program 111 are selected utilizing man-machine interface 107.

The term "real time" is used herein and in the appended claims. The term is used in the context of human perception. The processing of video and data representations occurs so fast that it can be captured, processed and displayed and the subject does not perceive any noticeable delay.

The invention has been described in terms of various embodiments. It is not intended that the invention be limited by the embodiments described above. It will be apparent to those skilled in the art that various changes and modifications may be made to the embodiments without departing from the spirit or scope of the invention. It is intended that the invention be limited in scope only by the claims appended hereto.

The invention claimed is:

1. A method comprising:
    Providing a motion capture apparatus in communication with a processor operable to capture three-dimensional video and data representations of a subject on a frame-by-frame basis;
    locating said subject in front of said motion capture apparatus;
    having said subject sequentially maintain each posture of a plurality of predetermined sequential stationary postures, each said posture being maintained by said subject for one of a predetermined period of time, the occurrence of a postural event, and the occurrence of a postural stability event;
    utilizing said motion capture apparatus to capture simultaneous frame-by-frame video and data representations of said subject while said subject maintains each posture of said plurality of predetermined sequential stationary postures;
    calculating a subject center of gravity (COG) for each frame of said frame-by-frame subject positional data representation;
    selecting for each said posture of said plurality of predetermined sequential stationary postures a COG for a predetermined frame of data as a reference COG for said posture;
    utilizing said reference COG to determine a reference vector for each said posture of said plurality of predetermined sequential stationary postures;
    utilizing each said subject COG for each said frame of data to calculate a frame vector;
    determining and storing a sway angle between said reference vector and each said frame vector;
    determining standard deviations of each said sway angle to represent a sway index angle for each posture.

2. A method in accordance with claim 1, comprising:
    determining and storing for each frame the length of a vector between the location of the reference COG and the location of said COG of said frame;

determining a standard deviation of vector lengths of all frames for each pasture of said plurality of predetermined postures during each said predetermined period of time to represent a sway index position; and averaging said sway index position for each predetermined posture.

3. A method in accordance with claim 2 comprising:

displaying a visual representation of an object to said subject to illustrate one of a predetermined plurality of predetermined test postures for said subject to emulate; and generating a composite visual representation comprising a visual representation of said subject as captured by said motion capture apparatus and said visual representation of said object.

4. A method in accordance with claim 1, comprising:

displaying a video visual representation to said subject for each of said posture of said plurality of predetermined sequential stationary postures.

5. A method in accordance with claim 1, comprising:

utilizing said motion capture apparatus to collect and store video representations of said subject on a frame-by-frame basis.

6. A method in accordance with claim 5, comprising:

displaying a representation to said subject for each of said predetermined postures.

7. A method in accordance with claim 6, comprising:

displaying a predetermined representation of said subject imitating each of said predetermined postures.

8. A method in accordance with claim 7, comprising:

generating a composite video representation of said predetermined representation of said subject and said representation of said subject.

9. A method in accordance with claim 8, comprising:

displaying said composite video representations.

10. A method in accordance with claim 9, comprising:

displaying said predetermined representation of said subject as one of a semitransparent image and a transparent image.

11. A method in accordance with claim 1, comprising:

capturing, on a frame-by-frame basis, three-dimensional video and data representations of a subject attempting to sequentially maintain each of a plurality of predetermined sequential postures each for a predetermined period of time;

providing one or more programs executable by said processor to calculate postural stability of said subject; and operating said processor to execute said one or more programs such that said processor utilizes said data representations to calculate postural stability of said subject.

12. A method in accordance with claim 11, comprising:

executing said one or more programs by said processor to calculate sway index angles and sway index positions for said subject.

13. A method in accordance with claim 11, wherein:

Executing said one or more programs by said processor to compare previously calculated postural stability of said subject with currently calculated postural stability of said subject.

* * * * *